United States Patent [19]
Orlando

[11] 3,805,094
[45] Apr. 16, 1974

[54] DRIVING CIRCUIT FOR A SWITCHING TRANSISTOR

[75] Inventor: Luciano Orlando, Milan, Italy

[73] Assignee: Honeywell Information Systems Italia, Calusa, Italy

[22] Filed: Jan. 19, 1973

[21] Appl. No.: 324,942

[30] Foreign Application Priority Data
Jan. 28, 1972  Italy .................................. 19883/72

[52] U.S. Cl. ................. 307/300, 307/270, 307/254
[51] Int. Cl. ............................................ H03k 17/00
[58] Field of Search ..................... 307/270, 300, 254

[56] References Cited
UNITED STATES PATENTS
3,546,492   12/1970   Barchok ............................ 307/300

OTHER PUBLICATIONS
IBM Tech. Discl. Bull. "Turn Off Circuit," Norton, Vol. 7, No. 6, 11/64, p. 428.

IBM Tech. Discl. Bull. "Transformers–Coupler Storage Charge Removal," Jacobson et al., Vol. 14, No. 6, 11/71 p. 1691.

Primary Examiner—Rudolph V. Rolinec
Assistant Examiner—B. P. Davis
Attorney, Agent, or Firm—Fred Jacob

[57] ABSTRACT

A transformer driving circuit for a floating-voltage switching device such as those employed in driving circuits for magnetic memories is provided. The circuit includes a driving transformer provided with an auxiliary winding and an auxiliary switching transistor driven by said winding to short circuit the base and emitter of the power switching transistor.

9 Claims, 1 Drawing Figure

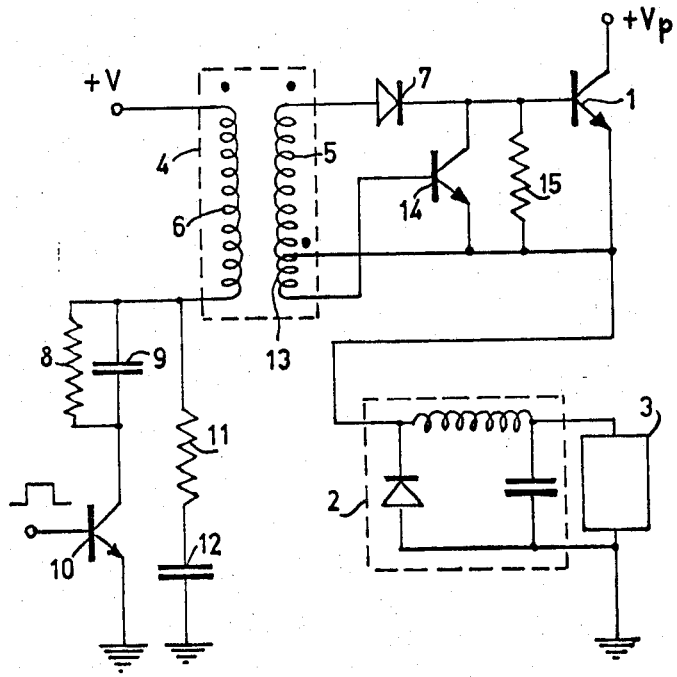

DRIVING CIRCUIT FOR A SWITCHING TRANSISTOR

BACKGROUND OF THE INVENTION

The present invention relates to a transformer driving circuit for a floating-voltage switching device, as those employed in driving circuits for magnetic memories, or in switching devices for on-off voltage regulators.

The invention is more particularly directed to driving circuits for voltage regulator switches.

Voltage regulating devices are known, wherein a non-regulated d.c. voltage, having a value exceeding the required regulated voltage, is applied by means of a controlled switch to a smoothing filter network comprising inductance and capacitance. A comparing circuit compares the output voltage to a fixed reference value and provides an error signal which is applied to a circuit controlling the switch. Usually, the switching transistor is operating outside the active condition, that is, it is controlled in such a way, to pass from the blocking (Off) condition to the satured (On) condition, and vice versa, very rapidly in order to increase the efficiency of the apparatus and to reduce the energy dissipated by the transistor. The regulation of the voltage may be obtained by two different methods; that is, a frequency-variation method and a time-rate variation method.

By the first method, the switching transistor is brought to the On condition during time intervals of constant and definite length, at a frequency which is inversely variable with respect to the output voltage. If this voltage is equal or higher than the required voltage, the transistor is driven On, thus transferring energy to the filtering network, at a low or even null frequency, so that the energy drawn by the load reduces the voltage at the filter output. If the output voltage is lower than the required voltage, the frequency at which the transistor is switched On increases, thus increasing the power transferred to the filter. As the On interval is fixed, the change in frequency causes the change of the duty cycle, that is of the rate of the conducting interval to the whole operation period. The power transferred to the filter at each period is proportional to the duty cycle.

This method of regulation has the drawback that the filtering network must be so designed, to account for the output voltage variation admitted during a period, for the lower frequency possible. This requires the use of relatively large capacitors and inductors, which are costly and bulky.

Therefore, the time-rate system is often preferred, so that the inductors and capacitors of the filter may be designed for a constant operating frequency, which may be chosen as the highest compatible with the required performance of the switching transistor.

By this system the change in the duty cycle is obtained by changing, in each period, the rate of the On interval to the whole period, at constant frequency.

Attention must be drawn to the fact that, for such regulation apparatus, the switching transistor is usually series connected to a leg of the feeding network and of the filter, which is not clamped to a fixed reference voltage, and is, therefore, at a floating potential.

Both collector and emitter are therefore submitted to a variable potential, and therefore the base must be controlled by a circuit unaffected by changes of such potential. As the control circuits of the transistors are usually fed by voltages referred to a fixed ground voltage, these circuits must be insulated with respect to the transistor base, and driving is accomplished by means of a pulse transformer.

This driving method, if the regulation is obtained by constant frequency and a variable duty cycle, has the draw-back, that the variation range of the duty cycle is necessarily reduced. In fact, the minority charges stored in the transistor base during the On condition, must be rapidly removed to allow the transistor to go over quickly to the Off condition, and this is achieved by suitably porportioning the driving transformer, which has the secondary connected between base and emitter. Choosing a transformer having a magnetizing inductance suitably low with respect to the equivalent resistance of the transformer windings and of the load, the voltage appearing across the secondary terminals in consequence of a rectangular voltage pulse applied to the primary winding, does not reproduce the shape of this pulse, but decreases exponentially with the time.

The secondary winding therefore, supplies a first direct voltage pulse, of a duration equal to that of the primary pulse, but decreasing with time, and a second inverted voltage pulse, having an initial amplitude equal to the voltage drop of the direct pulse, and also decreasing exponentially. In addition, ripples superimposed on these exponential curves are caused by the stray capacitances of the transformer, but these are irrelevant for the following description.

For more complete information about pulse transformers, reference may be made to many electronics textbooks, and particularly to the widely known book "Pulse Digital and Switching Waveforms" by Jacob Tillmann and Herbert Taub, published by McGraw-Hill, New York, 1965 (Chapter 3, pages 64–82).

Therefore, it may simply be remarked, that the inverse voltage pulse following the direct pulse removes the minority charges stored in the transistor base, thus favoring its prompt return to the Off condition.

However, for an adequate effect the inverse pulse must have a substantial value, and therefore the voltage drop of the primary pulse must also be substantial. On the other hand, the voltage drop must not be such as to reduce the voltage of the direct pulse under the minimum value required for maintaining the transistor On. As the voltage drop is dependent on the pulse duration, it is clear that this duration may not exceed a predetermined value, and therefore the range of the duty cycle variation is severely limited by these considerations.

The driving circuit according to the present invention obviates such inconveniences by permitting a quick removal of the stored minority charges without requiring a critical design of the driving transformer, and providing for a very large variability of the duty cycle, extending from a minimum substantially null, to a maximum of very close to 90 percent. In addition, it provides the quick removal of the minority charges by means of a branch of the circuit which is automatically switched on when required and switched off as soon as its task is accomplished, without need of any additional timing circuit, or similar devices.

SUMMARY OF THE INVENTION

Essentially the circuit according to the invention employs a driving transformer having a very high magnetizing inductance, provided with an auxiliary winding, and an auxiliary switching transistor driven by said auxiliary winding for short-circuiting the base and emitter of the power switching transistor.

BRIEF DESCRIPTION OF THE DRAWINGS

These and other features and advantages of the invention will appear clearly from a detailed description of a preferred embodiment thereof, with reference to the attached drawing in which:

The FIGURE shows a preferred embodiment of the driving circuit according to the invention.

DESCRIPTION OF A PREFERRED EMBODIMENT

The power switching transistor employed for the regulation is indicated by the reference numeral 1. This transistor, for instance of the NPN type, has the collector connected to the positive terminal of a non-regulated voltage source $+V_p$, and the emitter connected to the input of an inductance capacity filter 2. The output of the filter 2 is connected to a load 3. The feeding circuit is of course completed by a common ground connection. Transistor 1 is controlled by means of a pulse transformer 4, the secondary of which has the terminals connected respectively to the base and emitter of transistor 1. The connection to the base of transistor 1 is effected through a diode 7, conductive towards said base. The primary 6 of the pulse transformer has the terminals connected respectively to a positive voltage source +V, for instance, +5V, and to the collector of a control transistor 10 through a network comprising a resistor 8 and a parallel connected capacitor 9.

The control transistor 10 has the base connected to a suitable source of control pulses, not shown, and has the emitter connected to ground.

The resistor 8 and the capacitor 9 are not essential to the invention, however, they are convenient, because the resistor 8 limits the current flowing through the primary, and the capacitor reduces the delay introduced by the time constant L/R, L being the stray inductance of the transformer 4, and R the resistance of resistor 8. This delay is apparent when the switching transistor 10 is made conductive, and the operation of the circuit under such conditions will be described in detail later on.

As shown also by FIG. 1, the terminal of the primary connected to the resistor 8 and to capacitor 9 is connected to ground through resistor 11 and capacitor 12 series connected. Even resistor 11 and capacitor 12 are not essential to the operation of the invention, but are convenient because they attenuate the inverse voltage peak which appears when the control transistor 10 goes off. The operation of this circuit will also be better explained later on.

The pulse transformer 4 is provided in addition with an auxiliary winding 13, having the terminals connected respectively to the base and emitter of an auxiliary switching transistor 14, for instance of the NPN type. This transistor is parallel connected to the base-emitter junction of transistor 1: that is, its collector is connected to the base, and its emitter is connected to the emitter, of said transistor. The circuit according to the invention is completed by a resistor 15, of suitable value, parallel connected between the base and emitter of transistor 1.

The operation of the circuit is as follows:

In the rest condition, a null, or negative voltage is applied to the base of the control transistor 10, which therefore is Off. No current is flowing through the primary of transformer 4, and the transformer, which is assumed to be de-magnetized, does not generate any e.m.f.

The voltage existing between base and emitter of the transistors 1 and 14 is null, and both the transistors are Off.

When a square positive voltage pulse, of a predetermined duration is applied to the base of transistor 10, the same saturates, and becomes conductive.

A current $I_1$ starts circulating through the primary winding 6 of the pulse transformer 4, and the RC network comprising the resistor 8, the capacitor 9, and the transistor 10. This current, which magnetizes the transformer core, induces in the different windings an e.m.f. which forward biases the diode 7 and the base-emitter junction of transistor 1; therefore a current $I_2$ starts flowing through the secondary 5, the diode 7, and the base-emitter junction of transistor 1.

To be exact, a portion of such current flows through the resistor 15 instead of flowing through the base of transistor 1, but for high values of the resistor 15 with respect to the base resistance it may be disregarded.

The ratio between currents $I_1$ and $I_2$ is known to be in reverse proportion to the ratio between turns of the primary and secondary: as the load resistance of the secondary is very low, the currents $I_1$ and $I_2$ would reach a very high value. It is therefore convenient to limit these currents to a suitable value by means of the limiting resistor 8.

The current does not immediately reach the steady-state value, but goes on increasing toward said value in a manner that is exponential, if the capacitor 9 is disregarded.

The presence of the capacitor 9 in parallel with resistor 8 modifies this behavior, by introducing a suitable compensation for the stray inductance L, and allows the steady state value to be reached more rapidly, and with a moderate overshoot.

The capacitor 12 has a contrary effect, and tends to reduce such compensation, but due to the series connected resistor 11, its effect is very small and may be disregarded.

The current $I_2$, so established, turns On the transistor 1.

Considering the voltages, it is clear that the voltage across the terminals of the secondary must equal the forward voltage drop across diode 7 (for instance 0.7V), augmented by the forward voltage drop across base and emitter of transistor 1 (for instance 1V); this voltage is therefore 1.7V.

If the turn ratio between the primary and the secondary is equal to one, this is also the voltage across the terminals of the primary. The voltage drop across the transistor 8 is therefore equal to 3 volts, in the assumption that +V = 5V, and the voltage drop across emitter-collector of transistor 10 is 0.3V.

Transistor 14 remains Off, because, as is indicated by the dots marking the winding sense, in FIG. 1, the auxiliary winding provides an induced e.m.f. which backward biases the base of transistor 1 with respect to the emitter.

Therefore, for the duration of the control voltage pulse applied to the base of transistor 10, the same is On, and the transistor 1 is also On. It is assumed, of course, that the transformer core is so dimensioned, as not to become saturated.

Consider now what happens at the end of the control pulse.

The base of transistor 10 goes to zero or negative voltage, and transistor 10 goes Off. Current $I_1$ and the current $I_2$ decrease rapidly toward null. However, this null value is not reached immediately, because condenser 12, resistor 11 and the stray inductance form an oscillatory circuit, having a high damping coefficient, due to the proper choosing of the resistance of resistor 11. Therefore the currents $I_1$ and $I_2$ decrease accordingly in a way that may be assumed to be initially exponential. Also, at the same time, the voltages at the terminals of the primary and of the secondary decrease exponentially. This transitory period is very short and as soon as the voltage to the secondary terminals is reduced below approximately 0.7V, the secondary circuit, which was closed on the resistor 15 is opened, and the currents $I_1$ and $I_2$ cannot be maintained. The core of the transformer demagnetizes, thus inducing an e.m.f. in the winding in a direction opposed to the former one. This e.m.f. causes the base-emitter junction of transistor 14 to be forward biased, and therefore a base current is established. The transistor 14 goes On and practically short-circuits the base and emitter of the transistor 1.

Thus, the minority carriers stored in the base of the transistor during the On period, are quickly removed, and transistor 1 goes rapidly Off.

On the contrary, transistor 14 remains conductive for the entire time necessary for the transformer to demagnetize, and during this time the e.m.f. induced in the auxiliary winding 13 is limited to approximately 0.7V, that is, equal to the voltage drop across the base-emitter junction of transistor 14.

As known, for a transformer to be demagnetized it is required that the sum of the voltage pulses across the windings be null. As explained heretofore, during magnetization the transformer operates under a constant secondary voltage of approximately 1.7V, and during demagnetization operates under a constant voltage of 0.7V on the auxiliary winding 13. It can be stated that 1.7 $t_1$ = 0.7 K $t_2$ wherein $t_1$ is substantially the duration of the On time for the transistor 1, that is, the duration of the control pulse applied to transistor 10, $t_2$ is the demagnetizing time, and K the turn ratio between the secondary and auxiliary windings.

It follows that $t_2$ = (1.7 $t_1$) / (0.7 K): by equal values of t, the greater the turn ratio K between secondary and auxiliary winding the shorter wll be $t_2$.

This permits one to determine the maximum value of the duty cycle which can be obtained by the switching device as described, without sooner or later causing the saturation of the transformer, due to the fact that not enough time is allowed for complete demagnetization.

The shorter duration of the operation cycle is $t_1 + t_2$: therefore the maximum duty cycle is $t_1 / (t_1 + t_2)$ that is, approximately $t_1 / (t_1 + 2.4\ t_1/K) = K (K + 2.4)$. For $K = 10$ we obtain, for instance, $K / (K + 2.4) = 0.81$, that is, a maximum duty cycle of 81 percent.

It is apparent that with a turn ratio between secondary and auxiliary windings equal to 10, an inverse voltage of 7 V will appear at the terminals of the secondary, and the diode 7 must be able to sustain such inverse voltage.

Assuming that the turn ratio between secondary and primary is equal to one, the same voltage will appear at the primary terminals, and therefore the voltage applied across collector and emitter of the transistor 10 will be +V + 7 = 12V.

Therefore, this transistor also must be chosen with regard to the voltages which will be applied during de-magnetization.

A brief mention will now be made of the operation of the capacitor 12, the resistor 11, and also resistor 15.

It is known that, when a diode, or the base-emitter junction of a transistor, after having been subjected to an inverse voltage, is brusquely forward biased to become conductive, in order to allow a substantially high current to flow, the voltage drop across the junction is higher than the steady state voltage as much as by 100 percent.

This is due to the fact that, until a proper distribution of the minority carrier throughout the semiconductor material is reached, the conduction of the diode takes place by effect of the electrical field applied to the majority carriers, and not by diffusion.

This causes a voltage drop of a resistive type, depending on the current, to appear across the junction.

Therefore, referring to FIG. 1, at the beginning of the de-magnetization, a high inverse voltage could develop, if such voltage were not smoothed off by the capacitor 12. A quenching resistor 11 is provided to prevent unwanted oscillations in the circuit formed by the stray inductance of the transformer and by this capacitor.

It is obvious that the capacitor 12 and resistor 11, which in FIG. 1 have been represented as connected to the primary, may be equally as well connected either to the secondary, or to the auxiliary winding, when allowance is made for the different turn ratio.

Lastly, the function of the resistor 15, connected between the base and emitter of transistor 1, is to provide a reduced resistance path to the reverse base current of transistor 1 in the rest condition, after the transformer 4 has been demagnetized, as in this condition, the transistor 14 is Off.

In the above description reference has been made to a preferred embodiment of the invention: it is intended that manyfold variants to such embodiment may be carried out, as, for instance, substituting transistors of NPN type for those of the PNP type, or adopting a driving circuit different from the one described, without departing from the spirit and scope of the invention.

What is claimed is:

1. A driving circuit for a switching transistor comprising:
    a pulse transformer, having a primary, a secondary and an auxiliary winding with an auxiliary to secondary turn ratio lower than one;
    means for applying driving pulses to the primary of said transformer;
    a first switching transistor having base and emitter connected to the terminals of said secondary winding, one of said connections being made through a diode; and
    a switching device connected across the base and emitter of said first transistor for short circuiting the base emitter path of said first transistor in response to the voltage pulse induced in said auxiliary winding by the falling fronts of said driving pulses.

2. The driving circuit of claim 1, wherein said switching device comprises a second transistor having collector and emitter connected to the base and emitter of said first transistor, and the base connected to a terminal of said auxiliary winding.

3. The driving circuit of claim 1, comprising, in addition, a resistor connected across base and emitter of said first transistor.

4. The driving circuit of claim 1, wherein said means for applying electrical pulses comprise means for limiting the current of said pulses.

5. The driving circuit of claim 1, comprising, in addition, a resistance capacity network connected to a selected winding for reducing transient peak voltages.

6. The driving circuit of claim 2 which also comprises a resistor connected across the base and emitter of said first transistor.

7. The driving circuit of claim 6 which also includes a resistance capacitance network connected to one of said windings for reducing transient peak voltages.

8. The driving circuit of claim 7 wherein said means for applying electrical pulses includes means for limiting the current of said pulses.

9. The driving circuit of claim 8 wherein the resistance capacitance network is connected to said primary winding.

* * * * *